Jan. 5, 1954  I. W. LOVELADY ET AL  2,664,963
GAS AND MULTIPLE LIQUID SEPARATOR APPARATUS
Filed June 23, 1950  2 Sheets-Sheet 1

Isaac W. Lovelady
Sanford P. Kroeker
INVENTORS

BY Browning & Simms
ATTORNEYS

Jan. 5, 1954
I. W. LOVELADY ET AL
2,664,963
GAS AND MULTIPLE LIQUID SEPARATOR APPARATUS
Filed June 23, 1950
2 Sheets-Sheet 2
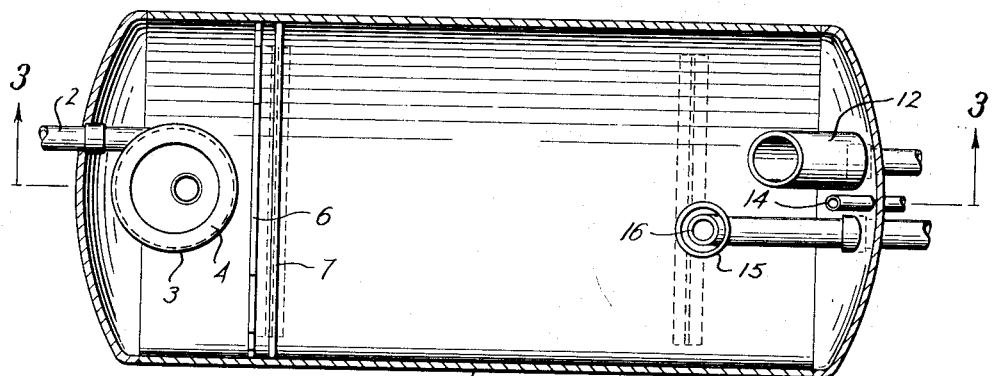
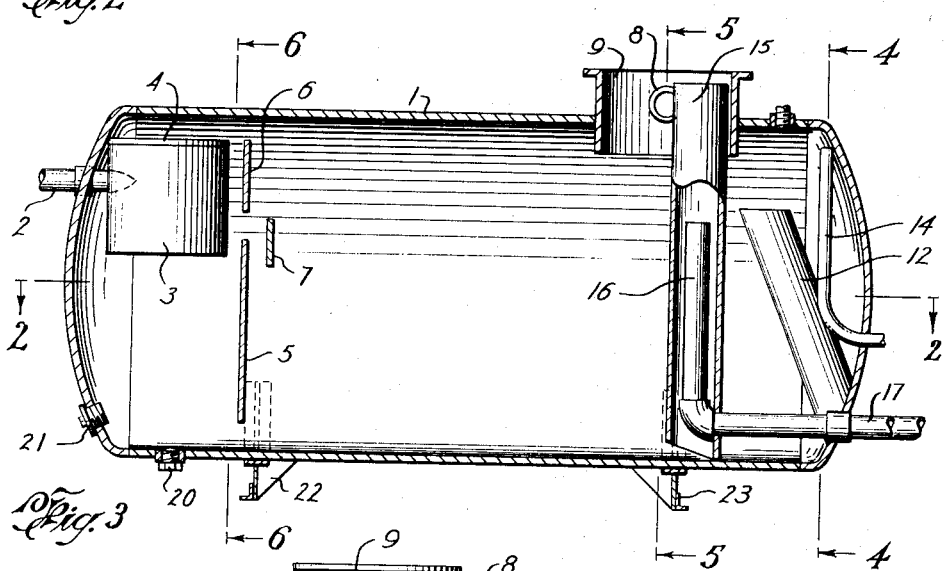
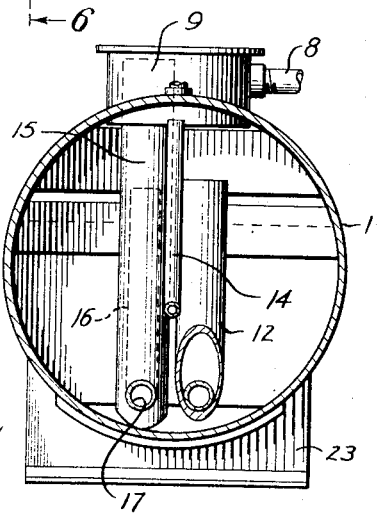
Isaac W. Lovelady
Sanford P. Kroeker
INVENTORS
BY
ATTORNEYS Patented Jan. 5, 1954

2,664,963

UNITED STATES PATENT OFFICE 2,664,963

GAS AND MULTIPLE LIQUID SEPARATOR APPARATUS

Isaac W. Lovelady and Sanford P. Kroeker, Odessa, Tex., assignors to Sivalls Tanks, Inc., Odessa, Tex., a corporation of Texas Application June 23, 1950, Serial No. 170,002

9 Claims. (Cl. 183—2.7)

This invention relates to improvements in separator apparatus and refers more particularly to the separation of a mixture of gas and two or more liquids which are separable from each other. The apparatus of this invention is especially adapted for the separation of mixtures of petroleum gas and oil produced from oil and gas wells in a mixture or emulsion with water, and for the treatment of similar mixtures which may occur in the course of refining hydrocarbon products.

In many oil and gas wells, the well fluids produced are a mixture of petroleum gas and crude oil oftentimes in the form of an emulsion including water. The water may be in an emulsion known as a "tight" emulsion which is hard to break so as to permit the separation of the oil and water, but in most cases it includes portions which may be termed "free water" or which consist of emulsions readily broken up so as to produce free water. It is desirable to separate these three general components at or near their location of production after which the separated oil, gas and water are drawn off through separate lines and the water disposed of in some suitable fashion.

It is therefore an object of this invention to provide separator apparatus which is rugged and may be economically manufactured and operated and which will separate gas and a plurality of liquids into a comparatively "dry" gas and a plurality of fractions of liquids of different specific gravity.

Another object is to provide in gas and liquid separator apparatus a centrifugal separation element combined with a relatively quiescent zone in which the gas and liquids flow at low velocities, substantially horizontally, with large area interface surfaces, so as to permit a more thorough and complete separation of gas from the liquids and of the liquids of different specific gravities from each other.

Another object of this invention is to provide in a gas and multiple liquid separator apparatus employing a centrifugal separation unit, a zone of relative quiescence wherein the gas flows at reduced velocity in a substantially horizontal path with little interference with the settling therefrom of entrained liquid droplets.

Another object is to provide in such an apparatus a zone of relative liquid quiescence wherein the liquids flow at reduced velocities in a substantially horizontal path and with little interference with the gravity separation of liquids of differing specific gravities.

Other objects and advantages of this invention will become apparent from the accompanying drawings taken with the following description wherein is set forth one embodiment of this invention. It will be understood that the embodiment set forth is by way of illustration and example only and is not to be taken by way of limitation.

In the drawings:

Figure 2 is a view in horizontal cross section with the interior parts shown in plan, of the apparatus shown diagrammatically in Figure 1.

Figure 3 is a view in vertical cross section taken substantially along the line 3—3 of Figure 2 and showing some of the interior parts in vertical cross section and others in elevation.

Figure 4 is a vertical cross section taken along the line 4—4 of Figure 3.

Figure 1:
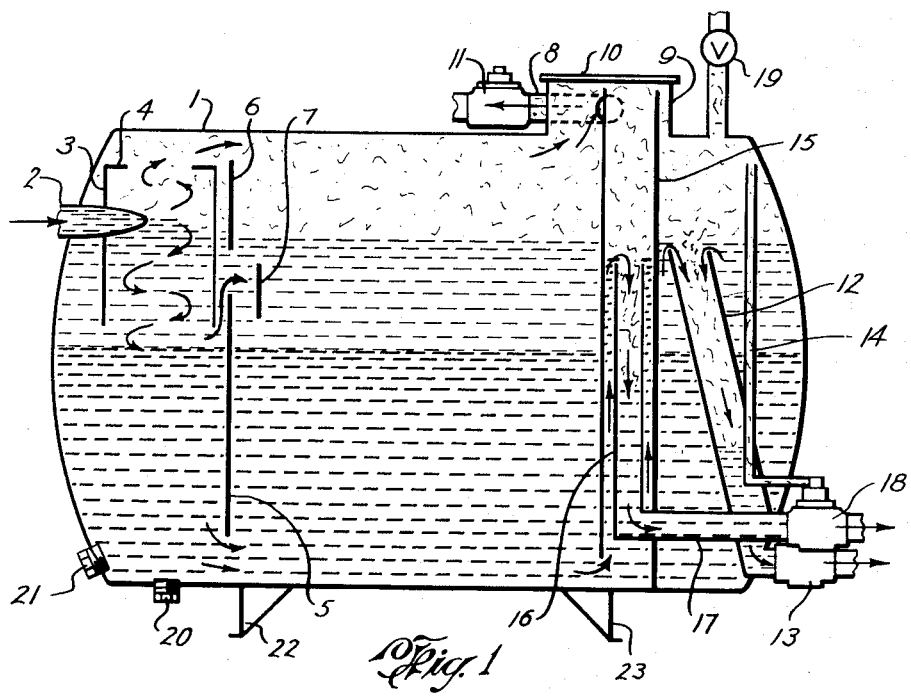
Figure 1 is a schematic view illustrating a gas and multiple liquid separator apparatus embodying this invention.
Figure 5:
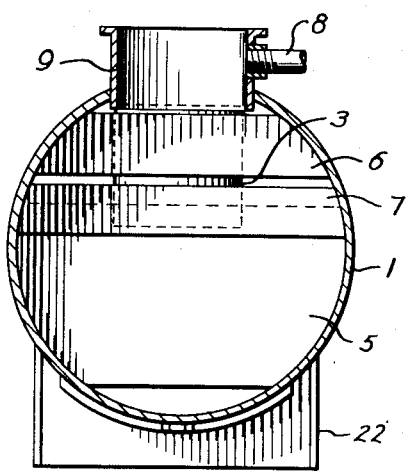
Figure 5 is a vertical cross section taken along the line 5—5 of Figure 3.
Figure 6:
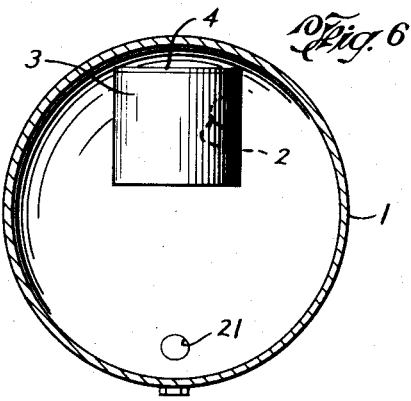
Figure 6 is a vertical cross section taken along the line 6—6 of Figure 3.

Referring now more in detail to the drawings, the numeral 1 indicates a shell or tank which is preferably mounted with its greatest dimension in a horizontal direction. This shell or tank is preferably of circular cross section and substantially cylindrical in formation but it will be appreciated that it may be made of other shape if so desired.

Adjacent one end or extremity of the shell 1 is an inlet conduit 2 through which the mixture to be treated enters the shell 1. This inlet conduit after passing through the wall of the shell 1 is in communication substantially in a tangential direction with and empties into the interior of a separator shell 3 disposed within the main tank 1 adjacent to the point where the inlet conduit 2 enters the tank 1. This separator shell is substantially circular in horizontal cross section and is illustrated as being cylindrical although in desired cases shapes other than true cylindrical shapes might be employed. Preferably it is located adjacent the upper portion of the tank 1 so that its upper end will project above the liquid level to be maintained in the tank and so that its lower end will be below such liquid level but sufficiently high so as to permit separation by gravity of heavier and lighter liquids from its lower end. Preferably its upper end is provided with an inturned annular flange 4 which is for the purpose of preventing in so far as possible the flow of any liquids from the upper end of the separator shell.

That portion of the main tank 1 which is below and which immediately surrounds the centrifugal separator just described is partially partitioned off from the remainder of the interior of the tank 1 by means of certain quieting baffles such as the baffle means 5 which extends from a point adjacent to but spaced from the lower wall of the tank 1 upwardly to a point above the lower end of the centrifugal separator shell 3, the baffle 6 which extends from a point spaced from the upper edge of the baffle 5 and in substantially vertical alignment therewith, upwardly to a point adjacent but spaced from the upper wall of the tank 1, and a baffle 7 which is substantially on a level with the space between the baffles 5 and 6 but spaced from the baffles 5 and 6 on the side thereof remote from the centrifugal separator. This baffle 7 preferably extends beyond the side and bottom extremities of the opening between the baffles 5 and 6 so as to prevent any substantial direct flow of liquid in a horizontal direction through the opening between the baffles 5 and 6 into the space on the side of these baffles which is remote from the centrifugal separator.

The baffles 5 and 6 may, of course, be regarded as a single baffle with an interruption adjacent its lower and upper extremities respectively for the purpose of permitting flow of the heaviest liquids accumulating below the centrifugal separator and the gases accumulating above the centrifugal separator from the zone immediately adjacent and below the centrifugal separator into the zone on the opposite side of the baffles 5 and 6. This baffle means may also be considered as interrupted at a level intermediate the ends of the centrifugal separator shell so as to permit a liquid of lower specific gravity which might collect below and about the lower portion of the centrifugal separator shell to flow horizontally into the space on the opposite side of this baffle means from the centrifugal separator shell.

The arrangement just described provides a zone of turbulence below and about the centrifugal separator shell in which the gas and liquids of various specific gravities will be turbulent but will be permitted to separate to some extent from each other by gravity. The gas may then flow from such zone of turbulence through the uppermost interruption in the baffle means into the uppermost portion of the space to the right of the baffle means which might be termed a zone of quiescence. Likewise, the heaviest liquids accumulating in the space below the centrifugal separator means will be drawn off from the lowermost portion of the turbulent zone into the zone of quiescence, and the lightest liquids accumulating within the zone of turbulence will be drawn off from the uppermost portion of the liquids within that zone into the zone of quiescence.

In the zone of quiescence the gas and liquids are permitted to flow slowly and without turbulence toward the opposite extremity of the tank 1, during which flow the gas and liquids partly separated from each other by the centrifugal separator and in the zone of turbulence will be permitted to separate to a still greater extent by the action of gravity.

Adjacent the extremity of the tank 1 which is opposite the centrifugal separator, the gas and the respective liquids are removed from the tank 1.

The gas is removed from the tank 1 by any suitable connection such as the conduit 8 which communicates with the interior of an upstanding dome or neck 9 mounted on the uppermost portion of the tank 1 and provided with a manway cover 10 through which access may be had to the interior of the tank 1. Flow of gas from the uppermost portion of the tank 1 may be controlled by any conventional pressure operated valve such as the valve 11 adapted to maintain a predetermined pressure within the tank 1.

Preferably the liquid level within the tank 1, which may be otherwise referred to as the gas liquid interface, is maintained at a point intermediate the ends of the centrifugal separator shell 3 and adjacent the point at which the mixture to be separated enters said shell. The maintenance of this liquid level is accomplished by means of a suitable wier such as the wier pipe 12 located in the tank 1 adjacent the extremity which is most remote from the baffle means 5 and 6 and the centrifugal separator 3. The level of the upper end of this wier pipe 12 definitely determines the level of the liquid or the gas liquid interface within the tank 1. This wier pipe 12 is in communication with the exterior of the tank 1 at some point substantially below the liquid level to be maintained within the tank 1, and provision is made for withdrawing liquid from within the wier pipe 12 by means of a conventional pressure actuated valve 13 adapted to be actuated by the hydraulic head of liquid on the intake side of the valve. Such valve is so adjusted as to maintain a level of liquid within the wier pipe 12 which is considerably below the level of liquid maintained within the tank 1. In order that the operation of the valve 13 might be controlled solely by the hydraulic head of liquid within the wier pipe 12 and not influenced by fluctuations of the gas pressure within the tank 1, a conduit 14 is provided for furnishing communication between the valve 13 and the gas space within the tank 1 above the liquid level. It will be seen that the upper edge of the wier pipe 12 provides a wier the high level side of which is the liquid level within the tank 1 and the low level side of which is within the wier pipe 12. It will further be seen that the valve 13 provides a means for withdrawing the liquid from the low level side of the wier provided by the wier pipe 12 to the outside of the tank 1, as such liquid accumulates.

For the purpose of maintaining the level of the interface between liquids of different specific gravities as such liquids accumulate within the tank 1, there is provided adjacent the wier pipe 12 or in some other location remote from the baffle means and the centrifugal separator 3, a vessel 15 which extends from above the liquid level within the tank 1 to a point below the desired liquid interface level and is imperforate between such levels. This vessel, however, is open above the liquid level within the tank 1 and preferably adjacent the uppermost portion of the tank 1 so that the gas pressure within the tank 1 will prevail within the uppermost portion of this vessel 15, and is open below the desired liquid interface level so that the only liquid entering the vessel 15 will be the heavier liquid accumulating within the tank 1.

For the purpose of providing an overflow of this heavier liquid and providing for its withdrawal from the tank 1 when the interface between liquids rises higher than desired, there is provided a wier within the vessel 15 which in the drawings is illustrated as a wier pipe 16. The upper end of this wier pipe provides the wier and will be located at such a level that when the upper liquid level is substantially at the upper end of the wier pipe 12, the interface level between liquids is at the level desired intermediate the interruptions in the lower extremity and the intermediate portion of the baffle means, the level of the heavier liquid column in the vessel 15 will be at the level of the upper end of the wier pipe 16. Inasmuch as the liquid between the liquid interface level and the liquid level is of lower specific gravity than the liquid providing the liquid column within the vessel 15, the liquid column within the vessel 15 will not rise as high as the liquid level outside of the vessel 15 within the tank 1 and, hence, the wier provided by the upper end of the wier pipe 16 should be located somewhat below the wier provided by the upper end of the wier pipe 12.

Now it will be seen that with the liquid level maintained constant by the upper end of the wier pipe 12, if the liquid level interface between liquids should rise higher than desired, it will mean that there will be less of the lighter liquid than desired to be maintained within the tank 1 and more of the heavier liquid. Thus, the head provided by the composite bodies of liquid within the tank 1 and outside of the vessel 15 will be greater than when the liquid level interface is at the point desired. This will cause the level of the heavier liquid column within the vessel 15 to rise somewhat and will spill some of this heavier liquid over the wier provided by the upper end of the wier pipe 16 thereby decreasing the amount of heavier liquid within the tank 1 and lowering the liquid level interface.

Contrariwise, if the liquid interface level should drop too low while the liquid level overall is maintained by the wier pipe 12, it would mean that there is less of the heavy liquid in the tank 1 than required to maintain the liquid interface level at the desired point. Under these circumstances, the column of liquid from the overall liquid level in the tank 1, including that due to the lighter liquid as well as that due to the heavier liquid, would be insufficient to raise the column of heavier liquid within the vessel 15 up to the top of the wier pipe 16, and hence as more liquid comes into the tank the heavier liquid would not run out over the wier pipe 16 but lighter liquid would instead be discharged over the top of pipe 12 thereby raising the liquid level interface to the point desired.

Liquid passing over the top of the wier pipe 16 is drawn off through the outlet pipe 17 and the liquid valve 18. This valve 18 may be in all respects identical with the valve 13 and will likewise be connected to the vent pipe 14 so that its operation will depend entirely upon the head of the heavy liquid standing within the wier pipe 16. The valve 18 would be so set that the liquid level within the wier pipe 16 would be maintained a substantial distance below the upper end thereof so that the interior of the wier pipe 16 would constitute the low-level side of the wier provided by the upper edge of this wier pipe.

In order to guard against the possibility that the gas pressure within the tank 1 may exceed safe limits through failure of the valve 11 or for some other reason, it is desirable that a relief valve 19 be employed, communicating with the upper portion of the tank 1. Provision is made for draining the tank through suitable means such as the plug 20, and adjacent the plug 20 there may be provided, if desired, a suitable hand hole closed by a plug 21 or the like.

The tank 1 may be supported in any suitable manner as by the supporting cradles 22 and 23 adjacent its opposite ends.

It is thought that the operation of the separator just described will be clear from the description and the accompanying drawings, but in order to make the operation more readily apparent it will be described as follows:

The mixture of gas and two liquids of different specific gravities, which is to be treated, enters through the inlet opening 2, and for the purpose of this description will be referred to as a gas, oil and water mixture. It will also be assumed that the oil and water portion of the mixture will exist in part as free-water in the form of bubbles in the oil or of free oil in the form of bubbles in the water, and possibly also in part as an emulsion incapable of being broken down by the apparatus herein described.

As this mixture is emptied at high velocity into the centrifugal separator shell 3, it is caused to swirl within this shell and create a centrifugal separating action which will cause it to release at least a major portion of the entrained gas and will cause a considerable separation of the free water and free oil. The gas thus separated will naturally pass out the top of the centrifugal separator shell but the liquids will be prevented from doing so by virtue of the inturned flange 4. The liquids, on the other hand, will settle downwardly and will tend to stratify despite the turbulence which will normally exist within the zone below and immediately adjacent the centrifugal separator shell 3. This stratification will result in the purest oil rising to a level highest in the liquid body and the purest water dropping to a level lowest in the liquid body while those portions of oil containing water will be closest to the oil-water interface and those portions of the water containing oil will likewise be closest to the oil-water interface.

As the operation proceeds, water from the lowest portion of the vessel will flow from the turbulent zone through the lowest interruption of the baffle means into the quiescent zone and begin to rise. At the same time the body of oil and emulsion on top of the water will begin to build up a layer and this process will continue until the oil and gas interface level begins to spill over the top of the wier pipe 12, or the body of oil and water within the tank 1 becomes such that it will raise the column of water within the vessel 15 to the point that it begins to spill over the top of the wier pipe 16. In either event such spilling will continue and will spill only oil or only water, as the case may be, until both the oil-gas interface and the oil-water interface assume the desired levels in the tank. Then both will continue to spill over their respective wier pipes 12 and 16 so that water will be produced through the valve 18 and oil through the valve 13 at the exact rates at which they are separated in the device. Meanwhile, the gas being produced will be released through the valve 11 at the same rate at which the gas is being produced in the device.

During the continued operation of the device, water will flow from the turbulent zone beneath the centrifugal separator shell through the lowermost interruption in the baffle means so that only the purest of the water in this turbulent zone will be admitted to the quiescent zone. In the same fashion, oil will flow from this turbulent zone into the quiescent zone only from the uppermost layer of oil and hence only the purest of the oil from the turbulent zone will be admitted to the quiescent zone. The lowermost interruption in the baffle means being so far below the centrifugal separation, the turbulence at this point will not be great and the flow into the quiescent zone will not be sufficient to disturb the quiescence therein. However, the point of interruption through which the oil flows through the baffle means into the quiescent zone being closely adjacent the zone of discharge from the centrifugal separator, may under some circumstances be sufficiently turbulent so that it would produce undesired turbulence in the upper portion of the quiescent zone. In order to avoid this, the auxiliary baffle 7 is so disposed as to prevent this turbulence about the centrifugal separator from being communicated into the quiescent zone. The body of water and oil in the quiescent zone, due to the large cross section of this zone, will flow very slowly toward their respective outlets and ample opportunity will be given for the maximum degree of separation of oil and emulsion on the one hand from water on the other hand, and of oil and emulsion on the one hand from the gas on the other hand, so that when the respective liquids and the gas reach those portions of the device more remote from the centrifugal separation, they will have become fairly well stabilized with respect to each other.

Added to this is the fact that in the final draw off of gas, oil and water, each is taken from that portion of the body of gas, oil or water as the case may be, which is freest from the other constituents.

From the foregoing it will be appreciated that a device has been provided which is fully capable of carrying out and accomplishing all of the objects and advantages sought by this invention.

The invention having been described, what is claimed is:

1. A gas and liquid multiple separator comprising an elongated tank mountable with its greatest dimension extending horizontally, a centrifugal separator cylinder mounted upright within the tank adjacent one extremity, a substantially tangential inlet to said cylinder intermediate its ends and providing communication between the interior of said cylinder and the exterior of said tank, baffle means separating the space below and directly adjacent said cylinder from the remainder of said tank and interrupted adjacent its lower and upper extremities and between the levels of the ends of said cylinder to permit communication with the remainder of the tank at said three levels, whereby a turbulent liquid zone is provided below and adjacent said cylinder to receive both heavier and lighter liquids from the lower end of said cylinder and a zone is provided above said cylinder for receiving turbulent gas from the upper end of said cylinder, and a quiescent zone is provided for receiving from the upper and lower parts of said turbulent liquid zone lighter and heavier liquids respectively and to receive in its uppermost portion gas from the upper end of said cylinder, a gas outlet from said tank, and means for maintaining in said tank a predetermined liquid level above said intermediate interruption and between the ends of said centrifugal separator cylinder.

2. A separator of the character defined in claim 1, wherein said means for maintaining the liquid level comprises a weir in the quiescent zone remote from said baffle means, and means for removing liquid from the low-level side of said weir to the outside of said tank.

3. A separator of the character defined in claim 1, including means for maintaining a predetermined lighter and heavier liquid interface level between said upper and lower interruptions.

4. A separator of the character defined in claim 3, wherein said means for maintaining the liquid interface level comprises a vessel extending from above said liquid level to below the desired liquid interface level and imperforate therebetween and open above said liquid level and below said desired liquid interface level, a weir within the imperforate portion of said vessel at a level between the predetermined liquid level and the predetermined lighter and heavier liquid interface level, and means for removing liquid from the low-level side of said weir to the outside of said tank.

5. A separator of the character defined in claim 3, wherein said means for maintaining the liquid level comprises a first weir in the quiescent zone remote from said baffle means and means for removing liquid from the low-level side of said weir to the outside of said tank, and said means for maintaining the liquid interface level comprises a vessel likewise in the quiescent zone remote from said baffle means and extending from above said liquid level to below the desired liquid interface level and imperforate therebetween and open above said liquid level and below the desired liquid interface level, a second weir within the imperforate portion of said vessel at a level between the predetermined liquid and the predetermined lighter and heavier liquid interface level, and means for removing liquid from the low-level side of said second weir to the outside of said tank.

6. A gas and liquid multiple separator comprising an elongated tank mountable with its greatest dimension extending horizontally, a centrifugal separator cylinder mounted upright within the tank adjacent one extremity, a substantially tangential inlet to said cylinder intermediate its ends and providing communication between the interior of said cylinder and the exterior of said tank, baffle means separating the space below and directly adjacent said cylinder from the remainder of said tank and interrupted adjacent its lower and upper extremities and between the levels of the ends of said cylinder to permit communication with the remainder of the tank at said three levels, whereby a turbulent liquid zone is provided below and adjacent said cylinder to receive both heavier and lighter liquids from the lower end of said cylinder and a zone is provided above said cylinder for receiving turbulent gas from the upper end of said cylinder, and a quiescent zone is provided for receiving from the upper and lower parts of said turbulent liquid zone lighter and heavier liquids respectively and to receive in its uppermost portion gas from the upper end of said cylinder, a gas outlet from said tank, and means for maintaining in said tank a predetermined liquid level above said intermediate interruption and between the ends of said centrifugal separator cylinder, and means for maintaining a predetermined lighter and heavier liquid interface level between the lower end of the cylinder and said lower interruption.

7. A gas and liquid multiple separator comprising an elongated tank mountable with its greatest dimension extending horizontally, a centrifugal separator cylinder mounted upright within the tank adjacent one extremity, a substantially tangential inlet to said cylinder intermediate its ends and providing communication between the interior of said cylinder and the exterior of said tank, baffle means separating the space below and directly adjacent said cylinder from the remainder of said tank and interrupted adjacent its lower and upper extremities and between the levels of the ends of said cylinder to permit communication with the remainder of the tank at said three levels, whereby a turbulent liquid zone is provided below and adjacent said cylinder to receive both heavier and lighter liquids from the lower end of said cylinder and a zone is provided above said cylinder for receiving turbulent gas from the upper end of said cylinder, and a quiescent zone is provided for receiving from the upper and lower parts of said turbulent liquid zone lighter and heavier liquids respectively and to receive in its uppermost portion gas from the upper end of said cylinder, an auxiliary baffle substantially on a level with the intermediate interruption of said baffle means but spaced therefrom in said quiescent zone to prevent substantial direct horizontal flow through said intermediate interruption into the main portion of said quiescent zone, a gas outlet from said tank, and means for maintaining in said tank a predetermined liquid level above said intermediate interruption and between the ends of said centrifugal separator cylinder.

8. A separator of the character defined in claim 7, including means for maintaining a predetermined lighter and heavier liquid interface level between said upper and lower interruptions.

9. A separator of the character defined in claim 7, and means for maintaining a predetermined lighter and heavier liquid interface level between the lower end of the cylinder and said lower interruption.

ISAAC W. LOVELADY.
SANFORD P. KROEKER.

References Cited in the file of this patent
UNITED STATES PATENTS

| Number | Name | Date |
| --- | --- | --- |
| 1,648,558 | Meston et al. | Nov. 8, 1927 |
| 2,167,160 | Raymond | July 25, 1939 |
| 2,179,131 | Millard | Nov. 7, 1939 |
| 2,284,737 | Hirshstein | June 2, 1942 |
| 2,457,959 | Walker | Jan. 4, 1949 |
| 2,479,386 | Matheis | Aug. 16, 1949 |
| 2,528,032 | Candler et al. | Oct. 31, 1950 |
| 2,601,903 | Erwin | July 1, 1952 |
| 2,601,904 | Erwin | July 1, 1952 |